Patented May 16, 1950

2,507,520

UNITED STATES PATENT OFFICE 2,507,520

DIFUNCTIONAL SILAHYDROCARBONS

John T. Goodwin, Jr., Midland, Mich., assignor to Dow Corning Corporation, Midland, Mich., a corporation of Michigan No Drawing. Application March 19, 1949, Serial No. 82,480

10 Claims. (Cl. 260—448.2)

The present invention relates to the production of new organosilicon compounds and to the fluids so produced.

The present organosilicon industry is based upon siloxanes which are materials in which the silicon atoms are linked through oxygen atoms. Another type of silicon compound is one in which the silicon atoms are linked directly to each other. Still a third type is one in which the silicon atoms are linked by organic radicals. The literature presents very little information on this last type of compound.

Objects of the present invention are to produce organosilicon compounds in which the silicon atoms are linked by methylene radicals. Other objects and advantages of the present invention will be apparent from the following description and the subjoined claims.

The compounds hereof are of the type $R(R_2SiCH_2)_nSiRY_2$ where each R represents a radical of the group consisting of alkyl and monocyclic aryl radicals, each Y represents a substituent of the group consisting of alkoxyl radicals and halogen atoms, and $n$ is an integer having a value of from 1 to 2 inclusive. Thus, each R may be an alkyl radical as from methyl to octadecyl or a monocyclic aryl radical such as phenyl and tolyl.

A preferred method for producing these compounds is to react a compound of the type $XCH_2SiRY_2$ and a compound of the type $R_3Si(CH_2SiR_2)_xY$ in liquid phase by contacting the former with an alkali metal in the presence of the latter compound. In the formulae Y and R have the above indicated meanings, X represents a halogen, preferably chlorine or bromine, and $x$ is an integer having a value of from 0 to 1 inclusive. This preferential reaction is not the necessary result, since a Wurtz reaction might be expected to occur between the halogenomethyl radicals. Also in connection with halogen atoms bonded to the silicons it might be expected that a disilane type of linkage would result. However, it has been found that the two components interact preferentially in the manner indicated when contacted as stated to the exclusion of other types of reaction.

The reactant of the type $XCH_2SiRY_2$ may be made in a variety of ways. Thus, in the case of chloromethylmethyldichlorosilane, this material may be produced by the direct chlorination of dimethyldichlorosilane as described in the literature. The equivalent ester may be produced by the substitution of alkoxy radicals for the chlorine atoms by reacting the above silane with the desired alcohol. Alternatively, these same materials may be produced by chlorinating methyltrichlorosilane, which product may then be reacted with a methyl Grignard reagent to give chloromethylmethyldichlorosilane. In case other hydrocarbon radicals than methyl radicals are desired, the latter of the above methods may be employed. That is, chloromethyltrichlorosilane may be reacted with Grignard reagents other than methyl Grignard, for example with an ethyl Grignard or higher alkyl Grignard such as octadecyl Grignard. Likewise, in this process, aryl groups can be substituted by the use of appropriate Grignards, such as phenyl Grignard.

The second reactant $R_3Si(CH_2SiR_2)_nY$ used in the preferred method involves two general types of compounds. The first type is $R_3SiY$ since in the general formula $n$ may be zero. The triorganohalosilanes have frequently been described in the literature. The other type is

$$R_3SiCH_2SiR_2Y$$

since in the general formula $n$ may also be 1. This reactant may be prepared from a compound of the type $YR_2SiCH_2SiR_2Y$, which compound may be prepared according to the methods set out in my application Serial No. 22,252 filed April 20, 1948.

The reaction in accord with the preferred method hereof is conducted by contacting the alkali metal with the silicon derivatives in liquid phase. Thus, it is possible to add the alkali metal in cut pieces or in a finely divided solid state to a mixture of the reactants at room temperature or at somewhat elevated temperature. In this case the reaction proceeds relatively slowly unless the temperature is elevated to above the melting point of the alkali metal. Another method is to suspend the alkali metal in a hydrocarbon boiling above the melting point of the alkali metal. The suspension may be maintained at a temperature above the melting point of the alkali metal. The organic reactants may then be added to the suspension of the alkali metal either in mixture or by adding the other reactant.

The reactants may be interacted in equimolecular amounts. An excess of the compound $R_3Si(CH_2SiR_2)_nY$ does not modify the course of the reaction and the excess may be later removed from the product. In case of an excess of the other material, $XCH_2SiRY_2$, this excess results in the production of higher molecular weight products, which may be separated from the desired products.

An alternative method for producing compounds of the type $R_3SiCH_2SiRX_2$ is to react a compound of the type $X_2RSiCH_2SiRX_2$ in liquid phase with a Grignard reagent of the type RMgX. In the formulae, each X represents a halogen atom and R represents a radical of the group consisting of alkyl and monocyclic aryl radicals. A compound of the type

$$X_2RSiCH_2SiRX_2$$

where each X represents a halogen atom, may be prepared by reacting a Grignard reagent of the type RMgX with a compound of the type $X_3SiCH_2SiX_3$.

The products hereof are of substantial importance as intermediates for the production of other organosilicon products. Thus, upon hydrolysis and condensation, products are obtained which contain both methylene and siloxane linkages. These products are excellent lubricants, and thus, may be utilized as lubricants, hydraulic fluids, damping fluids, diffusion pump fluids in special situations where chemical stability is a factor and for preventing foaming in aqueous systems containing organic materials.

The products directly obtained from the process of the present invention are of utility as agents for making hydrophyllic materials hydrophobic.

*Example 1*

A mixture of 108.5 parts by weight of $(CH_3)_3SiCl$ and 182.5 parts of $ClCH_2Si(C_2H_5O)_2CH_3$ was added to a dispersion of 46 parts of sodium in 649.5 parts of toluene at a temperature of 110° C. under reflux for a period of two hours. The addition was made at a rate sufficiently low that the heat of reaction was removed by the coolant in the reflux condenser. The products were then cooled, filtered and the salt cake was washed with toluene. Upon distillation 141.3 parts of a material were obtained which was identified as 2,2-diethoxy-4,4-dimethyl-2-4 disilapentane.

$(CH_3)_3SiCH_2SiCH_3(OC_2H_5)_2$

This was a yield of 64.3 percent. The compound has a boiling point of 181° C. at 740 mm., a density at 25° C. of .8505, a refraction index at 25° C. of 1.4113 and a specific refraction of .2921.

*Example 2*

A mixture of 343 parts by weight of $(CH_3)_2C_6H_5SiCl$ and 365 parts of $ClCH_2SiCH_3(OC_2H_5)_2$ was added to a dispersion of 92 parts of sodium in 866 parts of toluene at a temperature of 110° C. under reflux. The additon was made at a rate sufficiently low that the heat of reaction was removed by the coolant in the reflux condenser. The products were then cooled, filtered and the salt cake was washed with toluene. Upon distillation there were obtained 169.8 parts of the product $(CH_3)_2C_6H_5SiCH_2SiCH_3(OC_2H_5)_2$ for a yield of 30 percent. There was a 36.5 percent recovery of $(CH_3)_2C_6H_5SiCl$, the unreacted starting material. The product was found to have a boiling point of 160° C. at 25 mm., a density at 25° C. of .9435, a refractive index at 25° C. of 1.4750 and a specific refraction of .2985.

*Example 3*

Methyl magnesium Grignard in amount of 714 parts by weight in 1500 parts of ether, was gradually added to 1225 parts of $Cl_2CH_3SiCH_2Si(CH_3)Cl_2$ in 1000 parts of ether. Coupling occurred immediately. Following this, the reactants were cooled, the products filtered, and the ether removed in a stripping still. There was a yield of 532 parts of $(CH_3)_3SiCH_2SiCH_3Cl_2$ and 224 parts of $Cl(CH_3)_2SiCH_2Si(CH_3)_2Cl$. The product, $(CH_3)_3SiCH_2SiCH_3Cl_2$ was found to have a boiling point of 163° C. at 742 mm., a density at 25° C. of .9942, a refractive index at 25° C. of 1.4400, and a specific refraction of .2640.

*Example 4*

A mixture of 90 parts by weight of $(CH_3)_3SiCH_2Si(CH_3)_2Cl$ and 91 parts of $ClCH_2CH_2Si(OC_2H_5)_2$ was added to a dispersion of 23 parts of molten sodium in 173.2 parts of toluene. The addition was made at a rate sufficiently low so as to maintain the temperature at 110° C. The products were filtered and the toluene was stripped off. Upon distillation there were obtained 69.6 parts of the product $(CH_3)_3SiCH_2Si(CH_3)_2CH_2SiCH_3(OC_2H_5)_2$ for a yield of 47.3 percent. This compound was found to have a boiling point of 132° C. at 25 mm., a density of .8700 at 25° C. a refractive index of 1.4314 at 25° C. and a specific refraction of 0.2988.

*Example 5*

73.3 parts of $(CH_3)_3SiCH_2SiCH_3(OC_2H_5)_2$ and 78 parts of $CH_3COCl$ were mixed and refluxed for a total of eight hours. After standing overnight, the product was distilled. Distillation yielded 52.2 parts of a compound identified as $(CH_3)_3SiCH_2SiCH_3(OC_2H_5)Cl$ for a yield of 76 percent. This compound was found to have a boiling point of 175° C. at atmospheric pressure, a refractive index of 1.4245 at 25° C., a density of .9146 at 25° C., and a specific refraction of .2780.

That which is claimed is:

1. Compositions of the general formula $R(R_2SiCH_2)_nSiRY_2$ in which each R represents a radical of the group consisting of alkyl and monocyclic aryl radicals, Y represents a substituent of the group consisting of alkoxy radicals and halogen atoms, and $n$ is an integer having a value of from 1 to 2 inclusive.
2. Compositions in accordance with claim 1 in which each R represents methyl.
3. $(CH_3)_3SiCH_2SiCH_3Y_2$ in which Y is a substituent of the group consisting of alkoxy radicals and halogen atoms.
4. $(CH_3)_3SiCH_2SiCH_3(OC_2H_5)_2$.
5. $(CH_3)_3SiCH_2SiCH_3Cl_2$.
6. $(CH_3)_3SiCH_2Si(CH_3)_2SiCH_3(OC_2H_5)_2$.
7. Compositions in accordance with claim 1 in which each R represents a radical of the group consisting of methyl and phenyl radicals and which compound contains both methyl and phenyl radicals.
8. $C_6H_5(CH_3)_2SiCH_2SiCH_3(OC_2H_5)_2$.
9. The method which comprises reacting a compound of the general formula $X_2RSiCH_2SiRX_2$ in liquid phase with a compound of the general formula RMgX in which each R represents a radical of the group consisting of alkyl and monocyclic aryl radicals, and each X represents a halogen atom, the latter compound being employed in proportion between 1.5 and 2.5 mols per mol of the former, whereby a product of the formula $R_3SiCH_2SiRX_2$ is obtained.
10. The method in accordance with claim 9 in which each R represents methyl.

JOHN T. GOODWIN, Jr.

REFERENCES CITED

The following references are of record in the file of this patent:

Goodwin, "Jour. Am. Chem. Soc.," vol. 69 (1947), page 2247.

Bluestein, "Jour. Am. Chem. Soc.," vol. 70 (1948), pages 3068–3071.

Sommer, "Jour. Am. Chem. Soc.," vol. 69 (1947), page 980.